United States Patent [19]

Graffin

[11] Patent Number: 4,773,289

[45] Date of Patent: Sep. 27, 1988

[54] TORQUE WRENCH DEVICE

[75] Inventor: Jean-Jacques Graffin, La Chapelle Du Bois, France

[73] Assignee: S. A. Serac, France

[21] Appl. No.: 854,440

[22] Filed: Apr. 21, 1986

[30] Foreign Application Priority Data

Apr. 26, 1985 [FR] France .................. 85 06390

[51] Int. Cl.⁴ .......................... B25B 23/155
[52] U.S. Cl. ........................ 81/472; 81/467;
  192/150; 74/789; 74/4.2 R; 74/802; 74/354
[58] Field of Search ............ 81/467, 479, 472, 57.14,
  81/57.3, 57.11, 57, 57.22, 57.36, 57.32; 192/150;
  74/789, 412, 802, 352, 353, 354

[56] References Cited

U.S. PATENT DOCUMENTS

| | | | |
|---|---|---|---|
| 1,904,322 | 4/1933 | Norling | 81/57.14 |
| 2,606,472 | 8/1952 | Curtis | 81/57.11 |
| 3,110,206 | 11/1963 | Hake | 192/150 |
| 3,115,791 | 12/1963 | Dean | 192/150 |
| 4,671,364 | 6/1987 | Fink | 81/479 |

Primary Examiner—Frederick R. Schmidt
Assistant Examiner—Bradley I. Vaught
Attorney, Agent, or Firm—Gerald J. Ferguson, Jr.

[57] ABSTRACT

A screwing spindle (1) is mounted on a frame so as to be capable of rotating about its own axis, and also to be capable of up and down movement along its axis. The spindle is rotated by a drive gear (26) via an intermediate gear (24) which is mounted on a shaft (31) which is in turn mounted on a moving support (33) which is resiliently urged towards a rest position by return means (39). The wrench device also includes detector means (45) for detecting movement of said moving support (33). When a desired torque has been reached, the moving support (33) is driven away from its rest position by said drive gear (26), and said movement is detected by said detector means (45), which are arranged to then release the jaws of the spindle.

10 Claims, 2 Drawing Sheets

TORQUE WRENCH DEVICE

The present invention relates to a wrench device for screwing to a set torque, in particular for screwing stoppers onto the tops of bottle necks.

BACKGROUND OF THE INVENTION

Such wrench devices for screwing up to a set amount of torque are commonly referred to as "torque wrenches". Torque wrenches are used, inter alia, for screwing stoppers onto the tops of bottles when packaging liquid or powder substances on a mass production line. Another use for torque wrenches is doing up nuts on a mass production line.

Conventional torque wrenches have spindles fitted with mechanically controlled moving jaws, with the torque being measured by a friction clutch or by a magnetic drive. In either case, the maximum applied torque is adjustable, either by suitably compressing a spring, or else by moving magnets to change a magnetic field. When the predetermined torque is reached, the clutch slips until a jaw-opening command is applied, which generally takes place after a predetermined screwing time has elapsed.

Torque wrench spindles also exist having jaws which open automatically when the desired torque is reached, with the torque being measured by a complex spring-release device integrated in the torque wrench spindle.

All of the above-mentioned devices require the torque wrench spindle to be stopped in order to change the torque setting, and if the torque wrench forms a part of a high throughput machine having a plurality of torque wrench spindles, each spindle must be set individually. Workers operating such machines generally find this to be inconvenient, and in addition, productivity is reduced by any period for which the machine is stopped. Furthermore, when a friction clutch is used, clutch slipping leads to progressive wear or heating, and thus to reduce accuracy in torque setting.

One aim of the present invention is to provide a torque wrench device which is of simple structure and which has operating characteristics that remain constant regardless of conditions of use.

Another aim of the present invention is to provide a torque wrench device suitable for fitting to a multi-spindle machine, such that the torque of all of the spindles can be set together by a single common adjustment.

SUMMARY OF THE INVENTION

The present invention provides a wrench device for screwing to a set torque, the device comprising:
a frame;
a screwing spindle mounted to said frame in such a manner as to be capable of axially-directed alternating translation relative to said frame and to be capable of rotating about said axis, said spindle including gripping jaws and means for controlling said gripping jaws; and
a drive gear for causing said spindle to rotate about its axis;
said device including the improvement of an intermediate gear between said drive gear and said spindle, said intermediate gear being mounted on a shaft which is in turn mounted on a moving support having return means for urging said moving support towards a rest position and detector means for detecting displacement of said moving support, said detector means being connected to said means for controlling said gripping jaws.

Thus, when the torque corresponding to the force of the return means is reached, the moving support moves and the detector means opens the jaws and thus prevents further screwing.

Advantageously, the wrench device includes means for adjusting said return means. This makes it possible to adjust the torque at which the jaws open at will, simply by adjusting said return means.

Also advantageously, said moving support is constituted by a link pivotally mounted on said frame. Thus, the intermediate gear has stress applied thereto solely by said return means, and the set torque can be adjusted with great accuracy.

In a preferred embodiment, the link comprises a short portion and a long portion, and the intermediate gear and the detector means are respectively located at ends of the short portion and of the long portion. Thus a small displacement of the intermediate gear gives rise to a greater displacement of the long portion, thereby improving the accuracy to which such displacement can be detected.

In accordance with another preferred feature of the invention, the return means comprise a return spring disposed between an abutment fixed to the frame and an abutment fixed to the link, and if the device includes a plurality of spindles mounted on a common frame, the each abutment fixed to the frame is fixed to a common ring which is itself movable relative the frame. Thus, simply by adjusting the position of the ring, the positions of all the fixed abutments can be adjusted simultaneously, thereby setting the torque for all of the spindles in a single operation.

BRIEF DESCRIPTION OF THE DRAWINGS

Embodiments of the invention are described with reference to the accompanying drawings, in which.

MORE DETAILED DESCRIPTION

Figure 1:
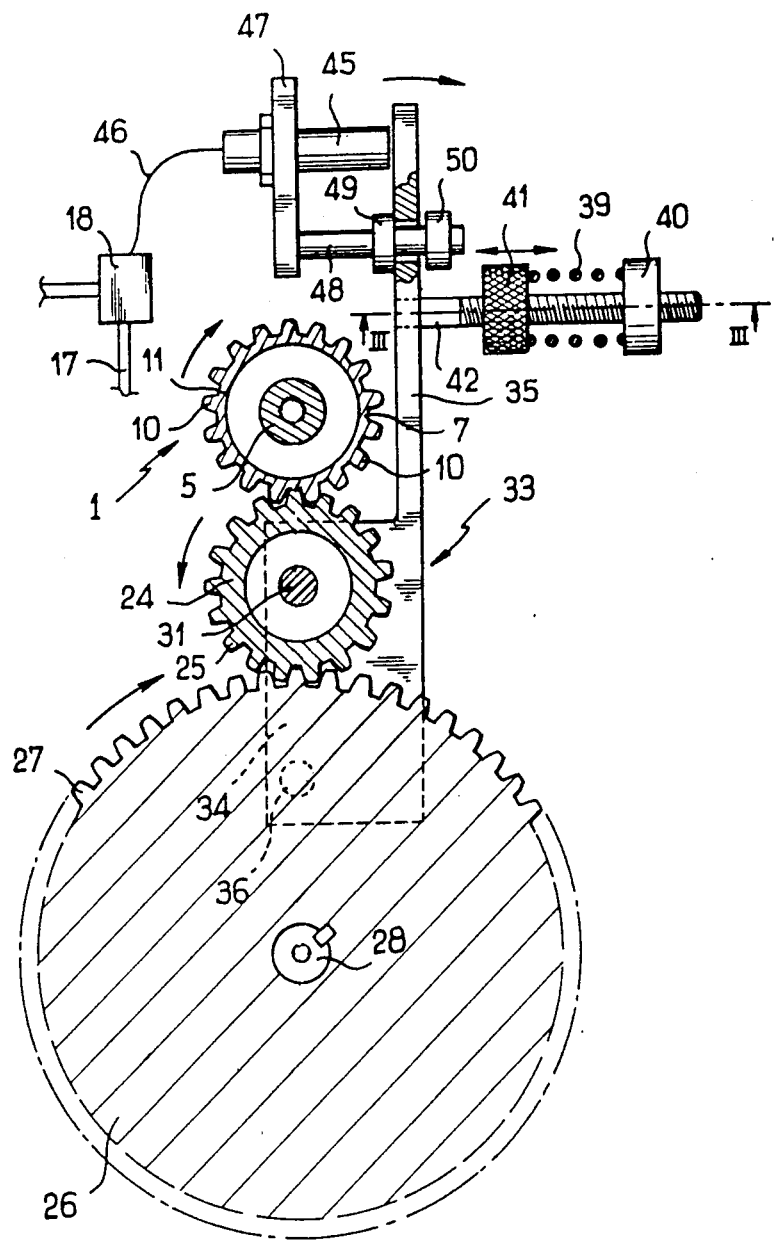
FIG. 1 is a sectional view of a portion of an embodiment of the invention.
Figure 2:
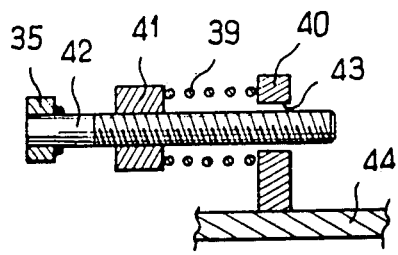
FIG. 2 is a view in partial section on a line III—III of FIG. 1.

With reference to FIGS. 1 and 2, a wrench device for screwing to a preset torque comprises at least one screwing spindle given the overall reference 1 which is fixed to a frame (not shown). The spindle is mounted to be capable of a axially-directed alternating translation motion, and also to be capable of rotating about its axis.

The spindle gear 7 is rotated by an intermediate gear 24 having peripheral teeth 25 which are in turn rotated by a drive gear 26 including peripheral teeth 27. The drive gear 26 is mounted on the shaft 28 of a motor (not shown) which is fixed on a portion of a frame (not shown).

The intermediate gear 24 is mounted to rotate freely about a shaft 31. The shaft 31 is mounted on a moving support having an overall reference 33. In the embodiment shown in FIG. 1, the moving support 33 is a link comprising a short portion 34 and a long portion 35. The shaft 31 is mounted at one end of the short portion 34. The opposite end of the short portion 34 is mounted on a pivot shaft 36 which is in turn mounted to pivot freely via a bearing on a plate 37 which is fixed to the frame. The shaft 31 of the intermediate gear 24 and the pivot shaft 36 of the link 33 are preferably substantially coplanar with the axis of rotation of the spindle 1 and the axis of the drive gear 26.

The link 33 constituting the moving support is returned to a rest position by return means comprising a helical spring 39 disposed between an abutment 40 fixed relative to the frame and an abutment 41 fixed relative to the link 33. In the embodiment shown, the abutment fixed relative to the link is a nut 41 which is adjustably mounted along a threaded rod 42 which extends transversely from the long portion 35 of the link 33. As can be seen in FIG. 2, the threaded rod 42 is free to move through an opening 43 in the abutment 40 which is itself fixed to a plate 44 which is fixed to the frame. It can thus be understood that the return force exerted on the moving support 33 is capable of being adjusted by displacing the nut 41.

At the end of the long portion 35, the device includes means for detecting displacements of the moving support 33, said means being constituted by a proximity detector 45, e.g. of the capacitive type, connected to the electrically controlled valve 18 by a wire 46. The proximity detector 45 is mounted on a plate 47 which is fixed to the frame. The plate 47 also carries a threaded rod 48 passing through the long portion 45 of the link 33 and supporting nuts 49 and 50 which serve as abutments for the long portion 35 of the link 33.

The device operates as follows: when screwing starts, the spring 39 holds the long portion 35 of the link 33 in abutment against the nut 49. The detector 45 detects the proximity of the ends of the portion 35 and applies a signal to the electrically controlled valve 18 for causing fluid under pressure to be applied. Jaws are clamped around the object to be screwed, e.g. a stopper, and the object is thus rotated by the gear 7 which is itself driven by the drive gear 26 via the intermediate gear 24. At the end of screwing, the torque on the various gears increases and when the torque exceeds the return force exerted by the spring 39, the gear 24 runs over the gear 7 through a distance allowed by the clearance between the teeth 25 and the teeth 27.

During this movement, the link 33 pivots about the shaft 36 and the long portion of the link 33 moves away from the proximity detector 45. The signal applied to the valve 18 is interrupted, thereby causing the bore 11 to be connected to the atmosphere and consequently causing the jaws to open. The abutment 50 against which the portion 35 of the link 33 comes to rest prevents the gear 24 moving too far which would cause the teeth 25 and the teeth 27 to jam against one another, thereby jamming the entire mechanism.

Figure 3:
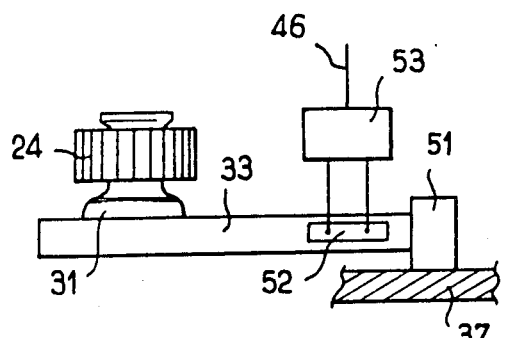
FIG. 3 is a side view of a portion of a first variant embodiment of the invention.

In the variant embodiment shown in FIG. 3, the intermediate gear 24 is carried by a link 33 in the form of a slightly flexible bar which has its far end from shaft 31 fixed in a post 51 itself fixed to the plate 37. Displacement of the link 33 is detected, in this case, by a strain gauge 52 which is preferably fixed to the side of the link 33 adjacent to its connection to the post 51. The strain gauge 52 is connected to an electronic device 53 whose output is connected to the line 46. Thus, the torque at which the jaws should open is set by acting on the parameters of the electronic circuit 53. For example, the electronic circuit 53 may be constituted by a variable gain amplifier.

Figure 4:
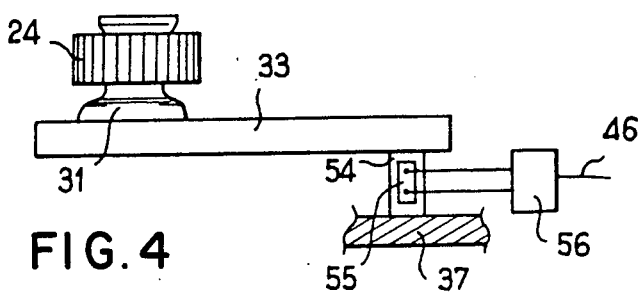
FIG. 4 is a side view of a portion of a second variant embodiment of the invention.

In the variant embodiment shown in FIG. 4, the gear 24 is mounted on a rigid beam 33 whose end distance from the shaft 31 is fixed to the plate 37 by means of a post 54. The post 54 is capable of twisting. Displacement of the beam 33 is detected by a torsion gauge 55 fixed on the side of post 54 and connected to an electronic device 56 whose output is connected to the line 46.

Figure 5:
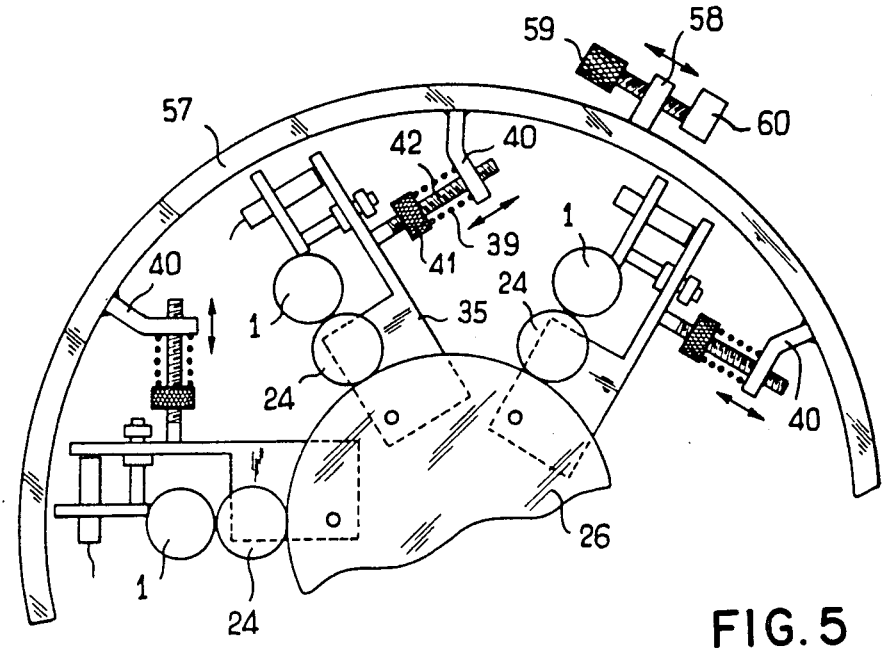
FIG. 5 is a diagrammatic plan view of a carrousel including a plurality of spindles, each including a torque wrench device in accordance with the invention.

FIG. 5 shows a preferred embodiment for use in a wrench assembly comprising a plurality of screwing spindles mounted on a common chassis, for example a rotary carrousel. Each screwing spindle 1 is associated with a corresponding intermediate gear 24 mounted on a corresponding link 33. Each link 33 includes return means and detector means analogous to those described above with reference to FIGS. 1 and 2. However, in this variant, each of the abutments 40 fixed to the frame is no longer directly fixed to a plate 44, but is fixed, instead, to a moving ring 57 having a projection 58 at one point on its circumference, through which there passes a screw 59 which bears against a fixed abutment 60 on the frame. It can immediately be seen that in this embodiment the nut 41 serves to provide pre-adjustment so that in a given position of the ring 57 each spindle is adjusted to the same torque. Once the pre-adjustment has been performed, the release torque of the set of spindles can readily be adjusted by acting on the screw 59 which then displaces the ring 57 and thus the entire set of abutments 40 against the return springs 39.

Naturally, the invention is not limited to the embodiments described above, and numerous variants may be applied thereto without going beyond the scope of the invention.

In particular, although the device has been described using electronic detectors, a fully pneumatic solution could be designed with the electrically-controlled valve 18 being replaced by a pneumatic relay, and with the proximity detector 45 being replaced by a fluidic detector. The springs 39 may also be replaced by a counterweight system in which the counterweights are adjustable in the same manner as counterweights on a set of scales, or else by pneumatic actuators, in which case the torque is adjusted by the feed pressure.

In the embodiment described with reference to FIGS. 1 and 2, the support plates 37, and 44 were assumed to be connected to a fixed frame; naturally, when the device is constituted in the form of a rotary carrousel, these plates constitute a part of the rotary platform of the carrousel. In this context, it should be observed that the screwing movement of the spindle gears 7 may be obtained either by mounting the drive gear 26 on the shaft of a motor as described above, or else by displacing the spindles relative to a fixed gear.

What is claimed is:

1. A wrench device for screwing to a set torque, the device comprising:
a frame;
a screwing spindle mounted to said frame in such a manner as to be capable of axially-directed alternating translation relative to said frame and to be capable of rotating about said axis, said spindle including gripping jaws and means for controlling said gripping jaws;
a drive gear for causing said spindle to rotate about its axis;
an intermediate gear between said drive gear and said spindle, said intermediate gear being mounted on a shaft which is in turn mounted on a support for pivotal movement with respect to a pivot axis; return means for urging said intermediate gear towards a rest position; and detector means for detecting displacement of said intermediate gear, said detector means being connected to said means for controlling said gripping jaws; the shaft of said intermediate gear and said pivot axis being substantially coplanar with the axis of rotation of said spindle and with the axis of said drive gear.

2. A wrench device according to claim 1, including means for adjusting said return means.

3. A wrench device according to claim 1, wherein said moving support is a link mounted on a pivot shaft which is in turn mounted on said frame.

4. A wrench device according to claim 3, wherein said link comprises a short portion and a long portion, and wherein said intermediate gear and said detector means are respectively disposed adjacent one end of said short portion and adjacent one end of said long portion.

5. A wrench device according to claim 3, wherein said return means comprise a spring disposed between an abutment to said frame and an abutment fixed to said link.

6. A wrench device according to claim 5, wherein said abutment fixed to said link is adjustably mounted on a rod extending transversely to said link and fixed thereto.

7. A wrench device according to claim 5, and including a series of spindles mounted on a common frame, each spindle being associated with a corresponding intermediate gear mounted on a corresponding link, wherein said abutments fixed to said frame are fixed to a moving ring which is itself fixed to said frame.

8. A wrench device according to claim 7, including means for adjustably positioning said ring relative to said frame.

9. A wrench device according to claim 1, wherein said moving support is a flexible link fixed to said frame, and wherein said detector means are constituted by a strain gauge fixed to said link.

10. A wrench device according to claim 1, wherein said moving support is a link connected to said frame by a flexible rod, and wherein said detector means are constituted by a torsion gauge fixed on the one side of said flexible rod.

* * * * *